United States Patent [19]

Immel et al.

[11] Patent Number: 5,763,350
[45] Date of Patent: Jun. 9, 1998

[54] CATALYSTS FOR REMOVING SULFUR COMPOUNDS FROM INDUSTRIAL GASES, A PROCESS FOR THEIR PRODUCTION AND THEIR USE

[75] Inventors: Otto Immel, Krefeld; Harald Müller, Dormagen, both of Germany

[73] Assignee: Bayer Aktiengesellschaft, Leverkusen, Germany

[21] Appl. No.: 832,154

[22] Filed: Feb. 6, 1992

[30] Foreign Application Priority Data

Feb. 12, 1991 [DE] Germany .................. 41 04 202.6

[51] Int. Cl.$^6$ .................. B01J 23/06; B01J 23/16; B01J 23/26; B01J 23/28
[52] U.S. Cl. ............................................. 502/307
[58] Field of Search ................................. 502/307

[56] References Cited

U.S. PATENT DOCUMENTS 3,518,208  6/1970  Schneider et al. ............... 502/307
3,536,755  10/1970  Parthasarathy et al. .......... 502/307 X
3,554,689  1/1971  Bloembergen et al. ............... 23/2
4,629,612  12/1986  van der Wal et al. ............. 423/244

FOREIGN PATENT DOCUMENTS 1667590  12/1975  Germany .
3020975  12/1981  Germany .
58-193738  11/1983  Japan ........................... 502/307

*Primary Examiner*—Elizabeth D. Wood
*Attorney, Agent, or Firm*—Joseph C. Gil; Lyndanne M. Whalen

[57] ABSTRACT

Catalysts for removing sulfur compounds almost completely from industrial gases are made by impregnating a suitable support with an oxide of at least one element selected from Group VIB of the Periodic System of Elements and at least two other oxides of elements selected from Groups IB, IIB, VIB and VIIIB of the Periodic System of Elements. Industrial gases in which sulfur compounds are present are brought into contact with these catalysts under conditions such that the sulfur compounds are converted to elemental sulfur and thus removed from the industrial gas.

1 Claim, No Drawings

CATALYSTS FOR REMOVING SULFUR COMPOUNDS FROM INDUSTRIAL GASES, A PROCESS FOR THEIR PRODUCTION AND THEIR USE

BACKGROUND OF THE INVENTION

This invention relates to catalysts for removing sulfur compounds from industrial gases, to a process for the production of these catalysts and to their use for removing sulfur compounds from industrial gases.

Sulfur-containing compounds, such as carbon oxysulfide, carbon disulfide and hydrogen sulfide, are frequent impurities in industrial gases such as carbon monoxide, carbon dioxide, nitrogen, methane and natural gas. The sulfur-containing compounds are formed, for example, during the processing of sulfur—containing gaseous, liquid or solid starting materials, such as natural gas, petroleum, coke and coal.

In many cases, these sulfur-containing constituents have to be removed from industrial gases to prevent catalyst damage, corrosion, unwanted secondary reactions in organic and inorganic synthesis. Removal is also necessary in view of the high toxicity of the sulfur-containing compounds, even in low concentrations.

Hydrogen sulfide, the most common companion of carbon oxysulfide and carbon disulfide, can be removed from gases by a number of known methods. However, the simultaneous removal of carbon oxysulfide and carbon disulfide from gases is difficult.

It is generally known that adsorbents, such as active carbon, zeolites or silica gel, have only a very limited capacity for absorbing carbon oxysulfide and carbon disulfide. Gas purification processes such as washing with liquid basic media, involve considerable effort because the solubility of carbon oxysulfide and carbon disulfide in those media is minimal. In addition, working up of the spent solutions involves environmental problems.

There has been some acceptance of processes in which carbon oxysulfide and carbon disulfide are converted into hydrogen sulfide on solid media (generally zeolites, aluminum oxide and the like) and the hydrogen sulfide is subsequently removed from the gas mixture by known methods. The disadvantage of these processes lies in their high energy consumption. The conversion of carbon oxysulfide or carbon disulfide only takes place at high temperatures, generally on the order of 400° to 800° C.

The process for converting carbon oxysulfide present in gases which is disclosed in DE-A-1 667 590 uses certain heavy metal oxides as catalysts on active carbon as support. The conversion reaction takes place at temperatures >20° C. The abrasion of the carbon and its combustibility make this process disadvantageous.

DE-A-220 394 discloses that aluminum oxide containing molybdenum, iron, tungsten, nickel or cobalt or certain combinations of these metals can be used as a catalyst for the reaction of carbon oxysulfide with steam. The metals are generally used in the form of sulfides. However, the hydrolytic reaction of carbon oxysulfide and carbon disulfide requires uneconomically high temperatures of 250° to 400° C.

SUMMARY OF THE INVENTION

The problem addressed by the present invention is the provision of catalysts for substantially removing sulfur compounds from gases which catalysts do not require high temperatures to be effective and which do not have the abrasion and combustibility disadvantages of the catalysts used in prior art processes.

This problem is resolved by a catalyst in which a mixture of at least one oxide of an element selected from the sixth secondary group of metals of the Periodic Table of Elements (i.e., Group VIB) and at least two other oxides of elements selected from the first (i.e., IB), second (i.e., IIB), sixth (VIB) or eighth (VIIIB) secondary group of metals of the Periodic System of Elements are uniformly dispersed in an inorganic, abrasion—resistant and non-combustible support.

DETAILED DESCRIPTION OF THE INVENTION

The present invention relates to catalysts for removing sulfur compounds from industrial gases. These catalysts are made of an inorganic, abrasion—resistant, non-combustible support which is uniformly impregnated with a mixture of oxides of metals from the 1st, 2nd, 6th and 8th secondary group of metals of the Periodic System of Elements (i.e., groups IB, IIB, VIB and VIIIB). The mixture of oxides of metals includes oxides of at least three metals, provided that at least one metal oxideIs an oxide of an element from the 6th secondary group of the Periodic System of Elements.

Preferred catalysts are those in which the inorganic support is aluminum oxide, a spinel, particularly magnesium aluminum oxide, a zeolite or mica. It is preferred that the catalyst have a surface area of from about 20 to about 400 m² g.

Preferred metal oxides are the oxides of Cu, Zn, Cr, Mo, W, Fe, Co and Ni.

In one preferred embodiment of the invention, the inorganic support is impregnated with each of the metal oxides in a quantity of from about 0.05 to about 4% by weight and more preferably from about 0.1 to about 2% by weight, based on the quantity of support material.

A particularly preferred catalyst is made up of an aluminum oxide support impregnated with at least three of the following oxides: copper oxide, iron oxide, molybdenum oxide, chromium oxide and zinc oxide.

The present invention also relates to a process for the production of the catalysts of the present invention. In this process, the inorganic support is initially introduced into a vessel in the form of granules with an average diameter of from about 0.1 to about 20 mm and, more particularly, from about 1 to about 10 mm. These granules are uniformly treated with aqueous solutions of compounds of metals of the 1st, 2nd, 6th and 8th secondary group of metals of the Periodic System of Elements. At least three metal compounds are applied to the substrate particles, including at least one metal from the 6th secondary group of metals of the Periodic System of Elements. The treated substrate particles are then dried and heated at a temperature of from about 200° to about 500° C. and preferably from about 280° to 420° C.

Aqueous solutions of nitrates and/or acetates of metals of the 1st, 2nd and/or 8th secondary group of metals of the Periodic System of Elements and ammonium salts of the chromates, molybdates and/or tungstates are preferably used in this process.

In one preferred embodiment of this process, the support is successively treated with several solutions containing one or more compounds of the metals and is optionally dried after each treatment.

The aqueous solutions of the compounds of the metals are preferably applied uniformly by immersion of the support in the corresponding aqueous solutions or by spraying of the support with the corresponding aqueous solutions.

The catalysts of the present invention are useful for the substantially complete removal of sulfur compounds such as COS, $CS_2$ and organic sulfur compounds, particularly mercaptans, from industrial gases such as methane, $CO_2$, $N_2$, CO and natural gas.

When the catalysts of the present invention are used to remove sulfur compounds from industrial gases, the gases to be cleaned are preferably a) charged with steam and then b) passed over a catalyst of the present invention at temperatures of from about 20° to about 150° C. and subsequently c) freed from the hydrogen sulfide formed in b) and from the hydrogen sulfide present in the gas from the outset.

The hydrogen sulfide is preferably removed in c) by passing the gases which have been passed over the catalyst in b) together with air and/or oxygen over a catalyst according to the invention at temperatures of from about 15° to about 50° C. It is preferred that the catalyst be regenerated, preferably with steam, to remove the sulfur formed in c) from the catalyst.

The catalysts of the present invention make it possible to quantitatively remove the sulfur—compounds mentioned above from gases at low temperatures (20° to 150° C.) and in very short residence times. The economics of removing the sulfur compounds is improved because the catalysts of the present invention have longer useful lives. The catalysts of the present invention also improve the safety of such processes.

The process according to the invention for the purification of gases by a catalytic reaction of gases to be purified (for example, gases containing carbon oxysulfide or carbon disulfide) may be carried out in an apparatus known as a hydrolysis tower. Hydrolysis towers generally include a heatable reaction tower filled with the catalyst of the present invention. The sulfur compounds which are passed through this tower are converted into hydrogen sulfide. The hydrogen sulfide thus formed and any hydrogen sulfide already present in the gas is then oxidized with air to form elemental sulfur. This oxidation may be carried out in another apparatus made up of a reaction tower known as an oxidation tower filled with the catalyst of the present invention.

The elemental sulfur accumulating during oxidation in the oxidation tower may readily be removed from the oxidation tower by hot steam. The catalyst in the tower is not affected by this treatment with steam.

Commercially available aluminum oxide in powder form or in any other form may be used for the production of the catalyst. The catalyst is preferably used in piece form for a fixed-bed process. Examples of piece form catalysts are extrudates, pellets, tablets or beads which preferably have dimensions of 0.1 to 20 mm, in length.

The catalyst according to the invention may be produced, for example, by impregnation of the inorganic support, preferably $\gamma\text{-}Al_2O_3$, with compounds of metals such as copper, molybdenum, zinc, iron and/or chromium. After drying, the support thus impregnated may be heated to temperatures of from about 200° to about 500° C. and preferably to temperatures of from about 280° to 420° C. The metals from the first, second, sixth and eighth secondary groups of metal of the Periodic System of Elements may be applied to the inorganic support simply by impregnation or by spraying the support with suitable salt solutions of these metals, dried and then heated. Drying is generally carried out at temperatures of from about 80° to about 130° C., optionally in a vacuum dryer. In the subsequent heating phase, the metal compounds applied are converted into oxides which adhere firmly to the inorganic support. However, the metals mentioned may also be applied to the support by co-precipitation of the metal hydroxide mixture from salts of the above-mentioned metals onto the support using basic compounds, such as alkali hydroxide or ammonia, and optionally removing the soluble components by washing with water. Suitable salts of the metals mentioned include acetates, chlorides, nitrates and sulfates. The drying at temperatures within the above-mentioned ranges is generally carried out over a period of from about 1 to about 48 hours and preferably from about 2 to about 20 hours. The heating stage is generally carried out over a period of from about 1 to about 12 hours and preferably from about 2 to about 6 hours. During the heating and drying stages, the temperature may be increased within the above-mentioned ranges.

The inorganic support may also be impregnated with an aqueous solution in which all of the metals in the form of their salts are dissolved. However, the metals may also be successively applied to the support either individually or in combinations by successive applications of the corresponding aqueous solutions. The catalyst may be dried after each impregnation so that it is sufficiently absorbent for the following impregnation.

The following Examples are intended to Illustrate the invention without limiting it in any way. Production of the catalyst

EXAMPLE 1

200 g of a commercially available $\gamma\text{-}Al_2O_3$ having a specific surface area of 350 $m^2/g$ and an average particle diameter of from 2 to 6 mm were impregnated with a freshly prepared solution of 3.71 g $Cu(CH_3COO)_2.H_2O$ 3.14 g $Fe(NO_3)_3.9H_2O$ 4.31 g $Zn(CH_3COO)_2.2 H_2O$ and 70 g water. The aluminum oxide thus impregnated was dried for 18 hours at 100°C. The aluminum oxide was then impregnated with another solution which had been prepared from 2.06 g $(NH_4)_6Mo_7O_{24}.4 H_2O$ 12.67 g $(NH_4)_2Cr_2O_7$ and 70 g water.

The aluminum oxide thus impregnated was dried for 18 hours at 100° C. and then heated for 4 hours at 400° C. The catalyst thus produced was used for the conversion of the sulfur compounds present in industrial gases (for conditions, see Tables 1 and 4 and test procedure)

EXAMPLE 2

200 g of a commercially available $\gamma\text{-}Al_2O_3$ having a specific surface area of 350 $m^2/g$ and an average particle diameter of from 2 to 6 mm were impregnated with a freshly prepared solution of 3.71 g $Cu(CH_3COO)_2.H_2O$ 3.14 g $Fe(NO_3)_3.9H_2O$ 4.31 g $Zn(CH_3COO)_2.2 H_2O$ and 80 g water.

The aluminum oxide thus impregnated was dried for 18 hours at

100° C. The aluminum oxide was then impregnated with a solution composed of 2.06 g $(NH_4)_6Mo_7O_2 4.4 H_2O$ in 70 g water. The aluminum oxide thus impregnated was dried for 18 hours at 100° C. and then heated for 4 hours at 400° C. The catalyst thus produced was used for the purification of industrial gases (for conditions, see Table 2 and test procedure).

EXAMPLE 3

200 g of a commercially available $\gamma Al_2O_3$ having a specific surface area of 350 m²/g and an average particle diameter of from 2 to 6 mm were impregnated with a solution of 3.71 g $CU(CH_3COO)_2 \cdot H_2O$
2.07 g $Ni(CH_3COO)_2 \cdot 4\ H_2O$
4.31 g $Zn(CH_3COO)_2 \cdot 0.2\ H_2O$ and 70 g water.

The aluminum oxide thus impregnated was dried for 18 hours at 100° C. The aluminum oxide was then impregnated with another solution which had been prepared from 2.13 g $Na_2WO_4 \cdot 2\ H_2O$
12.67 g $(NH_4)_2Cr_2O_7$ and 70 g water. The aluminum oxide thus impregnated was dried for 18 hours at 100° C. and then heated for 4 hours at 400° C. The catalyst thus produced was used for the purification of industrial gases (for conditions, see Table 3 and test procedure).

Purification of the gases (test procedure)

The gas to be purified was first passed through a water—filled container and saturated with steam. The composition of the gas to be converted (gas 1) was accurately determined by means of a gas chromatograph. The gas was then passed into a hydrolysis tower (500 ml). The hydrolysis tower was a double-walled vessel in which the temperature of the reaction tower was adjustable by means of a liquid. This tower was filled with a catalyst of the present invention. The converted gas (gas 2) left the hydrolysis tower. The composition of gas 2 was then determined by analysis. Gas 2 was then passed through an oxidation tower (500 ml). The oxidation tower was constructed in the same way as the described hydrolysis tower and was filled with the same catalyst. At the same time, air was introduced into the oxidation tower in an at least stoichiometric quantity, based on oxygen and hydrogen sulfide.

The gas freed from the sulfur-containing compounds (gas 3) left the oxidation tower and was tested for purity. The results are reported in Tables 1 through 4.

TABLE I

Catalyst of Example 1
Industrial gas: $N_2$

| Gas through-put | Temperature during | | Concentrations of | | | |
|---|---|---|---|---|---|---|
| | conversion | oxidation | gas 1 COS | gas 2 COS | gas 3 COS | $H_2S$ |
| [1/h] | [°C.] | [°C.] | [vpm] | [vpm] | [vpm] | [vpm] |
| 500 | 130 | 38 | 2310 | ≦10 | ≦10 | ≦10 |
| 800 | 130 | 38 | 2310 | ≦10 | ≦10 | ≦10 |
| 800 | 60 | 40 | 6880 | ≦10 | ≦10 | ≦10 |
| 1600 | 89 | 40 | 6880 | ≦10 | ≦10 | ≦10 |
| 800 | 60 | 40 | 5290 | 14 | ≦10 | ≦10 |
| 800 | 48 | 40 | 5200 | 21 | ≦10 | ≦10 |
| 300 | 20 | 24 | 6880 | 37 | ≦10 | ≦10 |

TABLE I-continued

Catalyst of Example 1
Industrial gas: $N_2$

| Gas through-put | Temperature during | | Concentrations of | | | |
|---|---|---|---|---|---|---|
| | conversion | oxidation | gas 1 COS | gas 2 COS | gas 3 COS | $H_2S$ |
| [1/h] | [°C.] | [°C.] | [vpm] | [vpm] | [vpm] | [vpm] | vpm = volume parts per million
gas 1 = concentration of COS before conversion
gas 2 = concentration of COS after conversion
gas 3 = concentrations of COS and $H_2S$ after oxidation

TABLE 2

Catalyst of Example 2
Industrial gas: N2

| Gas through-put | Temperature during | | Concentrations of | | | |
|---|---|---|---|---|---|---|
| | conversion | oxidation | gas 1 COS | gas 2 COS | gas 3 COS | $H_2S$ |
| [1/h] | [°C.] | [°C.] | [vpm] | [vpm] | [vpm] | [vpm] |
| 800 | 40 | 28 | 4200 | 1900 | ≦20 | ≦10 |
| 800 | 50 | 32 | 12600 | 3500 | ≦20 | ≦10 |
| 800 | 80 | 37 | 12600 | 1200 | ≦10 | ≦10 |
| 800 | 120 | 54 | 12600 | 205 | ≦10 | ≦10 |
| 800 | 150 | 61 | 12600 | 128 | ≦10 | ≦10 |

TABLE 3

Catalyst of Example 3
Industrial gas: $N_2$

| Gas through-put | Temperature during | | Concentrations of | | | |
|---|---|---|---|---|---|---|
| | conversion | oxidation | gas 1 COS | gas 2 COS | gas 3 COS | $H_2S$ |
| [1/h] | [°C.] | [°C.] | [vpm] | [vpm] | [vpm] | [vpm] |
| 300 | 59 | 21 | 12060 | 2740 | ≦10 | ≦10 |
| 300 | 70 | 34 | 12060 | 1460 | ≦10 | ≦10 |
| 300 | 100 | 42 | 11770 | 1129 | ≦10 | ≦10 |
| 800 | 105 | 42 | 11950 | 4600 | ≦10 | ≦10 |
| 800 | 134 | 54 | 11590 | 961 | ≦10 | ≦10 |
| 800 | 150 | 62 | 11590 | 709 | ≦10 | ≦10 |

TABLE 4

Catalyst of Example 1
Industrial gas: CO

| Gas through-put | Temperature during | | Concentrations of | | | |
|---|---|---|---|---|---|---|
| | conversion | oxidation | gas 1 COS | gas 2 COS | gas 3 COS | $H_2S$ |
| [1/h] | [°C.] | [°C.] | [vpm] | [vpm] | [vpm] | [vpm] |
| 300 | 41 | 28 | 4450 | ≦30 | ≦10 | ≦10 |
| 300 | 60 | 40 | 4300 | ≦20 | ≦10 | ≦10 |
| 500 | 41 | 28 | 2300 | ≦15 | ≦10 | ≦10 |
| 500 | 60 | 40 | 2300 | ≦15 | ≦10 | ≦10 |
| 800 | 130 | 51 | 2300 | ≦10 | ≦10 | ≦10 |

TABLE 4-continued

Catalyst of Example 1
Industrial gas: CO

| Gas through-put | Temperature during conversion | | Concentrations of | | | |
|---|---|---|---|---|---|---|
| | conversion | oxidation | gas 1 COS | gas 2 COS | gas 3 COS | H$_2$S |
| [1/h] | [°C.] | [°C.] | [vpm] | [vpm] | [vpm] | [vpm] |
| 300 | 130 | 51 | 2300 | ≦10 | ≦10 | ≦10 |
| 300 | 130 | 51 | 7180 | ≦15 | ≦10 | ≦10 |

As the test results show, the sulfur compound COS, for example, is almost completely converted into H$_2$S by the catalyst according to the invention. The H$_2$S is then oxidized almost completely to sulfur and hence removed from the gas. The sulfur adheres to the material (i.e., to the catalyst according to the invention) in the oxidation tower where it may be simply driven out with steam without any damage to the material.

What is claimed is:

1. A catalyst for removing sulfur compounds from industrial gases consisting essentially of an aluminum oxide, abrasion-resistant and non-combustible support uniformly impregnated with a mixture of copper oxide, iron oxide, molybdenum oxide and zinc oxide.

* * * * *